United States Patent
Kowalchuk

(10) Patent No.: US 10,939,603 B2
(45) Date of Patent: Mar. 9, 2021

(54) DEPTH ADJUSTMENT FEATURES FOR A SEED PLANTING UNIT OF AN AGRICULTURAL IMPLEMENT

(71) Applicant: CNH Industrial Canada, Ltd., Saskatoon (CA)

(72) Inventor: Trevor L. Kowalchuk, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 330 days.

(21) Appl. No.: 16/025,346

(22) Filed: Jul. 2, 2018

(65) Prior Publication Data

US 2020/0000003 A1    Jan. 2, 2020

(51) Int. Cl.
| A01B 63/00 | (2006.01) |
| A01C 5/06 | (2006.01) |
| A01B 63/22 | (2006.01) |
| A01C 7/08 | (2006.01) |

(52) U.S. Cl.
CPC ............ *A01B 63/008* (2013.01); *A01B 63/22* (2013.01); *A01C 5/062* (2013.01); *A01C 5/068* (2013.01); *A01C 7/08* (2013.01)

(58) Field of Classification Search
CPC ....... A01B 63/008; A01B 63/22; A01C 5/062; A01C 5/068; A01C 7/08
See application file for complete search history.

(56) References Cited

U.S. PATENT DOCUMENTS

| 5,520,125 A | 5/1996 | Thompson et al. |
| 5,815,992 A | 10/1998 | Wells et al. |
| 5,957,219 A | 9/1999 | Friggstad |
| 6,644,223 B2 | 11/2003 | Prairie et al. |
| 6,659,193 B1 * | 12/2003 | Best ........................ A01B 63/26 111/69 |
| 6,895,876 B2 | 5/2005 | Bergere et al. |
| 6,983,705 B1 | 1/2006 | Gust |
| 7,481,278 B1 | 1/2009 | Pomedli et al. |
| 7,540,246 B2 | 6/2009 | Friesen et al. |
| 7,921,931 B2 | 4/2011 | Henry et al. |
| 8,186,287 B2 | 5/2012 | Schilling et al. |
| 9,943,030 B2 * | 4/2018 | Sheppard ............... A01C 5/064 |

(Continued)

FOREIGN PATENT DOCUMENTS

| CA | 2893640 A1 | 12/2016 |
| WO | WO2018/018050 A1 | 1/2018 |

*Primary Examiner* — Jamie L McGowan

(74) *Attorney, Agent, or Firm* — Rebecca L. Henkel; Rickard K. DeMille

(57) ABSTRACT

A seed planting unit of an agricultural implement may include a wheel support arm having an upper portion and a lower portion. A wheel may be rotatably supported by the lower portion of the wheel support arm, the wheel configured to contact the soil surface to define a penetration depth setting for a ground engaging tool relative to the soil surface. A depth stop member may be provided in operative association with one of the support structure or the wheel support arm. A depth adjustment member may be selectively movable relative to the other of the support structure or the wheel support arm to vary a relative position between the depth adjustment member and the depth stop member. The depth stop member may selectively abut one of the plurality of steps when the wheel is contacting the soil surface to set the penetration depth setting for the ground engaging tool.

14 Claims, 12 Drawing Sheets

(56) References Cited

U.S. PATENT DOCUMENTS

| | | | |
|---|---|---|---|
| 10,064,324 B2* | 9/2018 | Gervais | A01C 5/064 |
| 2019/0000004 A1* | 1/2019 | Sloneker | A01C 7/203 |
| 2020/0000003 A1* | 1/2020 | Kowalchuk | A01C 5/062 |

* cited by examiner

DEPTH ADJUSTMENT FEATURES FOR A SEED PLANTING UNIT OF AN AGRICULTURAL IMPLEMENT

FIELD OF THE INVENTION

The present subject matter relates generally to agricultural implements, and more specifically, to depth adjustment features for a seed planting unit of an agricultural implement.

BACKGROUND OF THE INVENTION

Generally, agricultural seed planting units are towed behind a tractor or other work vehicle via a mounting bracket secured to a rigid frame of an agricultural implement, such as a planter or seeder. These seed planting units typically include a ground engaging tool or opener that forms a furrow or seed planting trench for seed deposition into the soil. Specifically, the opener is used to break the soil to enable seed deposition. After the seed is deposited, the opener is followed by a packer wheel that packs the soil on top of the deposited seed. The packer wheel also serves to adjust the penetration depth of the opener within the soil. In certain configurations, the penetration depth of the opener is adjustable by varying a vertical position of the packer wheel relative to the opener.

In typical configurations, the packer wheel is pivotally coupled to a packer support structure by a packer arm. Rotation of the packer arm relative to the packer support structure varies the vertical position of the packer wheel, thereby, in turn, adjusting the penetration depth of the opener. In certain configurations, the packer arm includes a series of openings configured to receive a fastener. The openings are positioned such that the angle of the packer arm relative to the packer support structure may be varied by securing the fastener to a particular opening. However, removing the fastener from one opening, rotating the packer arm relative to the packer support structure, and securing the fastener within another opening is a time consuming process. Furthermore, certain agricultural implements have multiple seed planting units, and therefore have multiple openers (e.g., greater than 50, 60, 70, 80, 90, or more). Because the openers are typically configured to maintain the same penetration depth setting, the duration of the depth adjustment process is multiplied by the number of openers coupled to the implement. Consequently, reconfiguration of the implement for a different penetration depth setting may result in large delays in seeding operations, thereby decreasing seeding efficiency.

Accordingly, a seed planting unit for use within an agricultural implement that includes improved depth adjustment features for allowing more efficient reconfiguration of the depth settings of the implement's openers would be welcomed in the technology.

BRIEF DESCRIPTION OF THE INVENTION

Aspects and advantages of the invention will be set forth in part in the following description, or may be obvious from the description, or may be learned through practice of the invention.

In one embodiment, the present subject matter is directed to a seed planting unit of an agricultural implement, with the seed planting unit generally including a ground engaging tool configured to penetrate a soil surface, a support structure configured to support the ground engaging tool, a wheel support arm, and a wheel. The wheel support arm may be pivotally coupled to the support structure of the seed planting unit at a pivot point and may include an upper portion and a lower portion. The wheel may be rotatably supported by the lower portion of the wheel support arm and may be configured to contact the soil surface to define a penetration depth setting for the ground engaging tool relative to the soil surface. The seed planting unit may further include a depth stop member and a depth adjustment member. The depth stop member may be provided in operative association with one of the support structure or the wheel support arm while the depth adjustment member may be provided in operative association with the other of the support structure or the wheel support arm. The depth adjustment member may generally include a base surface and define a stepped profile spaced apart from the base surface, the stepped profile defining a plurality of steps disposed at varying distances relative to the base surface. The depth adjustment member may be configured to be selectively movable relative to the other of the support structure or the wheel support arm to vary a relative position between the depth adjustment member and the depth stop member. Additionally, the depth stop member may be configured to selectively abut one step of the plurality of steps when the wheel is contacting the soil surface to set the penetration depth setting for the ground engaging tool.

In another embodiment, the present subject matter is directed to an agricultural implement including a frame and a plurality of seed planting units supported by the frame, with the seed planting units being configured to deposit seeds within a field as the implement is being moved across the field. Each seed planting unit may generally include a ground engaging tool configured to penetrate a soil surface, a support structure configured to support the ground engaging tool, a wheel support arm, and a wheel. The wheel support arm may be pivotally coupled to the support structure of the seed planting unit at a pivot point and may include an upper portion and a lower portion. The wheel may be rotatably supported by the lower portion of the wheel support arm and may be configured to contact the soil surface to define a penetration depth setting for the ground engaging tool relative to the soil surface. The seed planting unit may further include a depth stop member and a depth adjustment member. The depth stop member may be provided in operative association with one of the support structure or the wheel support arm while the depth adjustment member may be provided in operative association with the other of the support structure or the wheel support arm. The depth adjustment member may generally include a base surface and define a stepped profile spaced apart from the base surface, the stepped profile defining a plurality of steps disposed at varying distances relative to the base surface. The depth adjustment member may be configured to be selectively movable relative to the other of the support structure or the wheel support arm to vary a relative position between the depth adjustment member and the depth stop member. Additionally, the depth stop member may be configured to selectively abut one step of the plurality of steps when the wheel is contacting the soil surface to set the penetration depth setting for the ground engaging tool.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
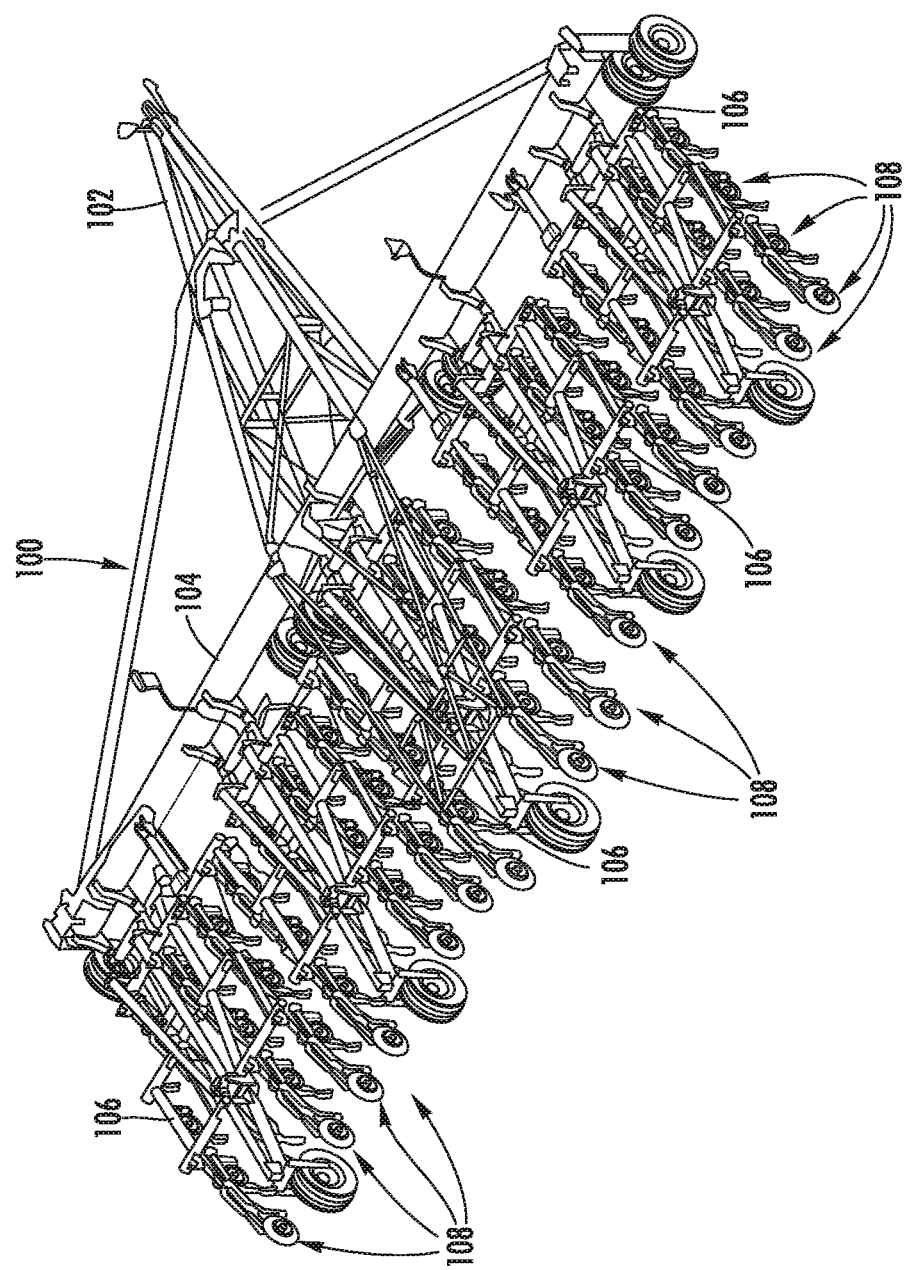
FIG. 1 illustrates a perspective view of one embodiment of an agricultural implement including multiple seed planting units in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a seed planting unit for an agricultural implement. In several embodiments, the implement may correspond to a planter or seeder and may include a plurality of seed planting units coupled to or otherwise supported by a frame of the planter/seeder. In one embodiment, each seed planting unit may include a ground engaging tool configured to open the soil surface to create a seed trench or furrow, and a wheel rotatably supported by a corresponding wheel support arm of the seed planting unit, with the wheel being configured to roll across or otherwise contact the soil surface to set a penetration depth of the ground engaging tool, as well as to close the seed trench upon deposition of seeds therein.

Additionally, in accordance with aspects of the present subject matter, each seed planting unit may be configured to allow a penetration depth setting for the ground engaging tool to be selectively adjusted. Specifically, the seed planting unit may include one or more depth adjustment components and/or features configured to allow the vertical position of the wheel to be adjusted relative to the ground engaging tool, which, in turn, may result in a corresponding adjustment in the penetration depth setting. As such, the depth adjustment components(s) and/or feature(s) may be used to set the desired penetration depth for the ground engaging tool based on, e.g., the soil composition or seed type, to allow for more efficient and/or effective seeding operations.

In several embodiments, the seed planting unit may include a depth stop member provided in operative association with one of the support structure or the wheel support arm. Additionally, the seed planting unit may include a depth adjustment member configured to be selectively movable relative to the other of the support structure or wheel support arm to adjust the penetration depth for the ground engaging tool. Specifically, in one embodiment, the depth adjustment member may be configured to have a stepped profile, with the stepped profile defining a plurality of stepped surfaces or "steps." As will be described below, the depth stop member may be configured to abut against one of the steps when the support structure is in a working position (i.e., when the wheel is contacting the surface of soil) to set a penetration depth setting of the associated ground engaging tool. In such an embodiment, the depth stop member may be configured to be spaced apart from the depth adjustment member when the support structure is in an adjustment position such that the depth adjustment member may be moved relative to the support structure or wheel support arm to vary a relative position between the depth adjustment member and the depth stop member (e.g., to adjust the penetration depth setting of the associated ground engaging tool). Moreover, in one embodiment, the various steps of the depth adjustment member may be spaced apart from its base surface by varying distances to allow the depth stop member to be held at differing discrete distances from the wheel support arm or the support structure, thereby permitting the penetration depth setting for the ground engaging tool to be similarly adjusted in incremental amounts corresponding to the difference in distances between adjacent steps of the depth adjustment member.

Additionally, in several embodiments, the seed planting unit may include a locking plate generally positioned against a side of the support structure or wheel support arm opposite the depth adjustment member. In such embodiments, the locking plate may be configured to be coupled to the depth adjustment member such that the depth adjustment member may be tightened against the support structure or wheel support arm in order to limit movement of the depth adjustment member relative to the support structure or wheel support arm.

In another embodiment, the seed planting unit may include an actuator configured to adjust the position of the depth adjustment member relative to the support structure or wheel support arm. Specifically, the actuator may be configured to selectively actuate the depth adjustment member such that the depth adjustment member may be moved relative to the support structure or wheel support arm, thereby permitting the penetration depth setting for the ground engaging tool to be adjusted automatically.

It should be appreciated that, in accordance with aspects of the present subject matter, the position of the depth adjustment member relative to the support structure or wheel support arm may be adjusted either manually or automatically to adjust the penetration depth setting for the ground engaging tool. For instance, in one embodiment, an operator may be allowed to manually adjust the positioning of the depth adjustment member (e.g., pushing and/or pulling against the depth adjustment member). In another embodiment, as indicated above, the seed planting unit may include an electronically controlled actuator coupled to the depth adjustment member (e.g., a fluid-drive actuator). In such an embodiment, the actuator may be configured to be selectively controlled to actuate the depth adjustment member so as to move the member relative to the support structure or wheel support arm, thereby permitting the penetration depth setting for the ground engaging tool to be adjusted automatically.

Referring now to the drawings, FIG. 1 illustrates a perspective view of one embodiment of an agricultural implement 100. In general, the implement 100 is configured to be towed behind a work vehicle, such as a tractor (not shown). As shown in FIG. 1, the implement 100 may include a tow bar assembly 102, which is shown in the form of an A-frame hitch assembly. The tow bar assembly 102 may include a hitch configured to attach to an appropriate tractor hitch via a ball, clevis, or other coupling. Additionally, the tow bar assembly 102 may be coupled to a tool bar 104, which, in turn, supports multiple tool frames 106. Moreover, in several embodiments, each tool frame 106 may include multiple seed planting units 108, such as a plurality of hoe openers, coupled thereto or supported thereby. As discussed in detail below, each seed planting unit 108 may be configured to facilitate quick and efficient reconfiguration of the unit 108 for varying penetration depth settings in accordance with aspects of the present subject matter.

It should be appreciated that the configuration of the implement 100 described above and shown in FIG. 1 is provided only to place the present subject matter in an exemplary field of use. Thus, it should be appreciated that the present subject matter may be readily adaptable to any manner of implement configuration.

Figure 2:
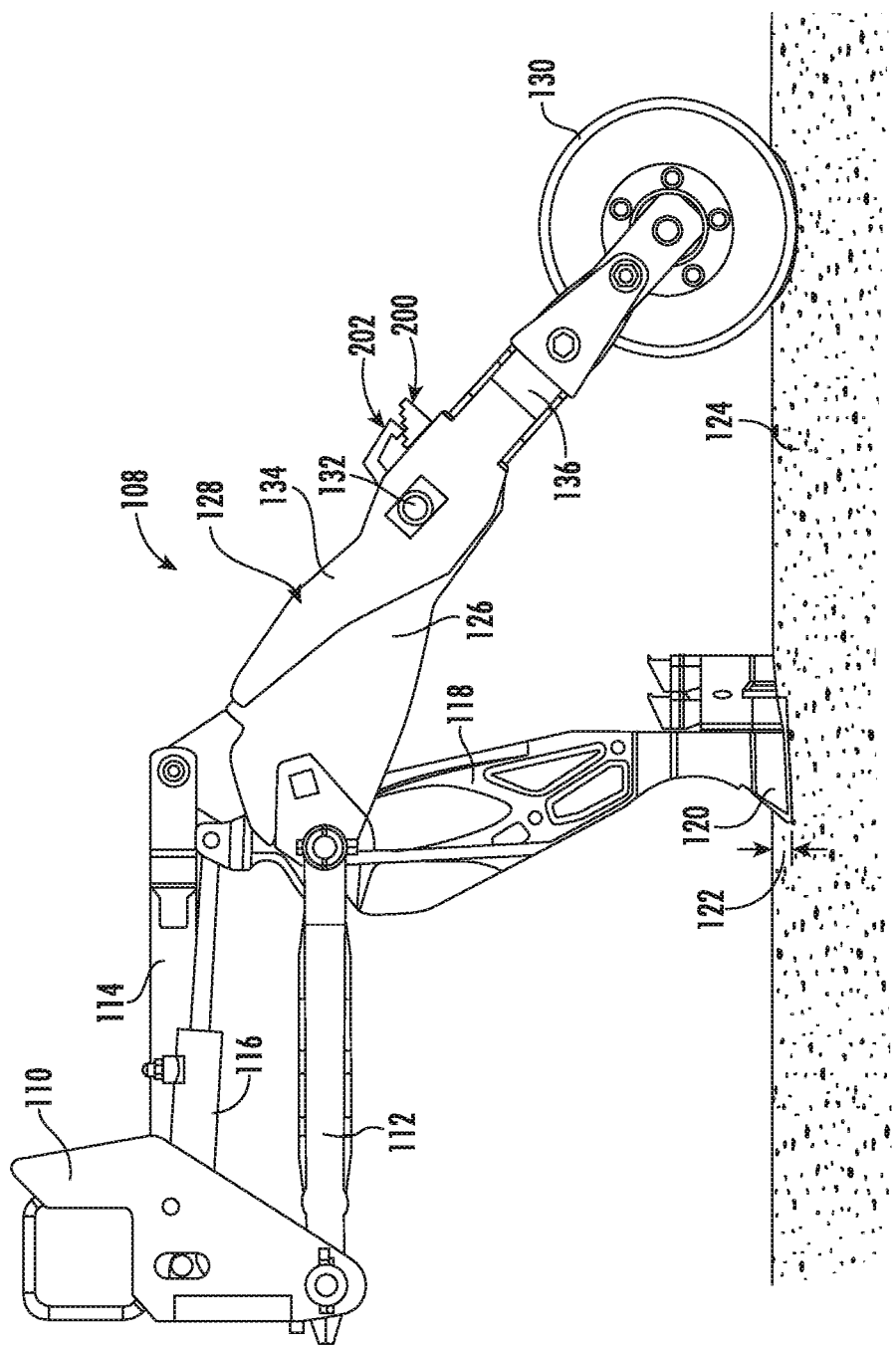
FIG. 2 illustrates a side view of one embodiment of a seed planting unit suitable for use within the agricultural implement shown in FIG. 1 in accordance with aspects of the present subject matter, particularly illustrating the seed planting unit including a depth stop member and an associated depth adjustment member for adjusting the penetration depth setting of a ground engaging tool of the unit.

Referring now to FIG. 2, a side view of one embodiment of a seed planting unit 108 suitable for use within an agricultural implement (e.g., the implement 100 shown in FIG. 1) is illustrated in accordance with aspects of the present subject matter, particularly illustrating the unit 108 including one embodiment of depth adjustment components or features configured to facilitate reconfiguration of the unit's penetration depth setting. It should be appreciated that, although the seed planting unit 108 is shown and described herein as corresponding to a hoe opener, the seed planting unit 108 may generally correspond to any suitable row unit having any suitable configuration that facilitates the deposition of seeds within the soil. Additionally, it should be appreciated that, although the seed planting unit 108 will generally be described in the context of the implement 100 shown in FIG. 1, the unit 108 may generally be configured to be installed on any suitable implement having any suitable implement configuration.

As shown in FIG. 2, the seed planting unit 108 includes a mounting bracket 110, a first linkage member 112, a second linkage member 114, and a biasing device or actuator, such as a cylinder 116 (e.g., hydraulic and/or pneumatic piston-cylinder assembly). In one embodiment, the cylinder 116 may be hydraulically coupled to a power supply that provides a flow of pressurized hydraulic fluid which displaces a piston rod extending from the cylinder. The mounting bracket 110 and associated hardware are generally configured to interface with the tool frame 106 (FIG. 1), thereby securing the seeding planting unit 108 to the implement 100 (FIG. 1). For instance, multiple seed planting units 108 may be mounted in parallel along the tool frame 106 (FIG. 1) to form a seeding assembly or unit. In the illustrated embodiment, the first linkage member 112, the second linkage member 114, and the mounting bracket 110 generally form elements of a parallel linkage, also known as a four bar linkage. As will be appreciated, components of the seed planting unit 108, such as the mounting bracket 110 (and associated hardware), first linkage member 112, and second linkage member 114, may be made of any suitable material, such as steel.

As is illustrated in FIG. 2, the cylinder 116 may be attached to a shank 118 via a pin at the end of the piston rod. A ground engaging tool, such as the illustrated opener 120, is also attached to the shank 118 and is configured to engage the soil. Contact force between the opener 120 and the soil establishes a moment about a shank pivot joint. This moment is resisted by the force applied to the shank 118 by the cylinder 116. Furthermore, the linkage is configured to facilitate vertical movement of the implement 100, while maintaining the opener 120 at a desired penetration depth setting 122 within the soil 124. The desired penetration depth setting 122 may be selected based on soil conditions, or environmental factors, among other considerations. As illustrated, the linkage is coupled to a wheel support structure, such as the illustrated support structure 126.

A wheel support arm 128, including a packer wheel 130, is pivotally coupled to the support structure 126 by a pin 132 disposed through openings within the wheel support arm 128 and the support structure 126. The pin 132 is generally positioned at an interface between an upper portion 134 and a lower portion 136 of the wheel support arm 128. The packer wheel 130 is rotatably coupled to the lower portion 136 of the wheel support arm 128 and is configured to roll along or otherwise contact the soil surface to both pack the soil on top of deposited seeds and limit the penetration depth setting 122 of the opener 120. The pin 132 enables rotation of the wheel support arm 128 with respect to the support structure 126. However, in a working mode, rotation of the wheel support arm 128 relative to the support structure 126 is blocked by selective contact between a depth adjustment member 200 and a depth stop member 202 of the seed planting unit 108.

As discussed in detail below, in one embodiment, the depth adjustment member 200 is configured to be movable relative to the wheel support arm 128 when it is desired to adjust the penetration depth setting 122 of the opener 120. Specifically, in several embodiments, the depth adjustment member 200 is configured to define a stepped profile along which the depth stop member 202, which is operatively associated with the support structure 126, may abut or contact during the working mode to limit rotation of the wheel support arm 128. In such embodiments, the depth adjustment member 200, and its associated stepped profile, may be moved relative to the wheel support arm 128 to adjust which "step" of the stepped profile the depth stop member 202 is configured to contact when in the working mode, which, in turn, varies the vertical positioning of the opener 120 relative to the packer wheel 130, thereby altering the penetration depth setting of the opener 120. Once a desired penetration depth setting 122 has been established, the depth adjustment member 200 may be locked into position relative to the wheel support arm 128, thereby limiting rotation of the wheel support arm 128 and enabling the seed planting unit 108 to enter the working mode. As previously discussed, the packer wheel 130 rotates across the surface of the soil to limit the penetration depth setting 122 of the opener 120. Consequently, the difference in vertical position between the packer wheel 130 and the opener 120 defines the penetration depth setting 122 of the opener 120 within the soil 124.

Figure 3:
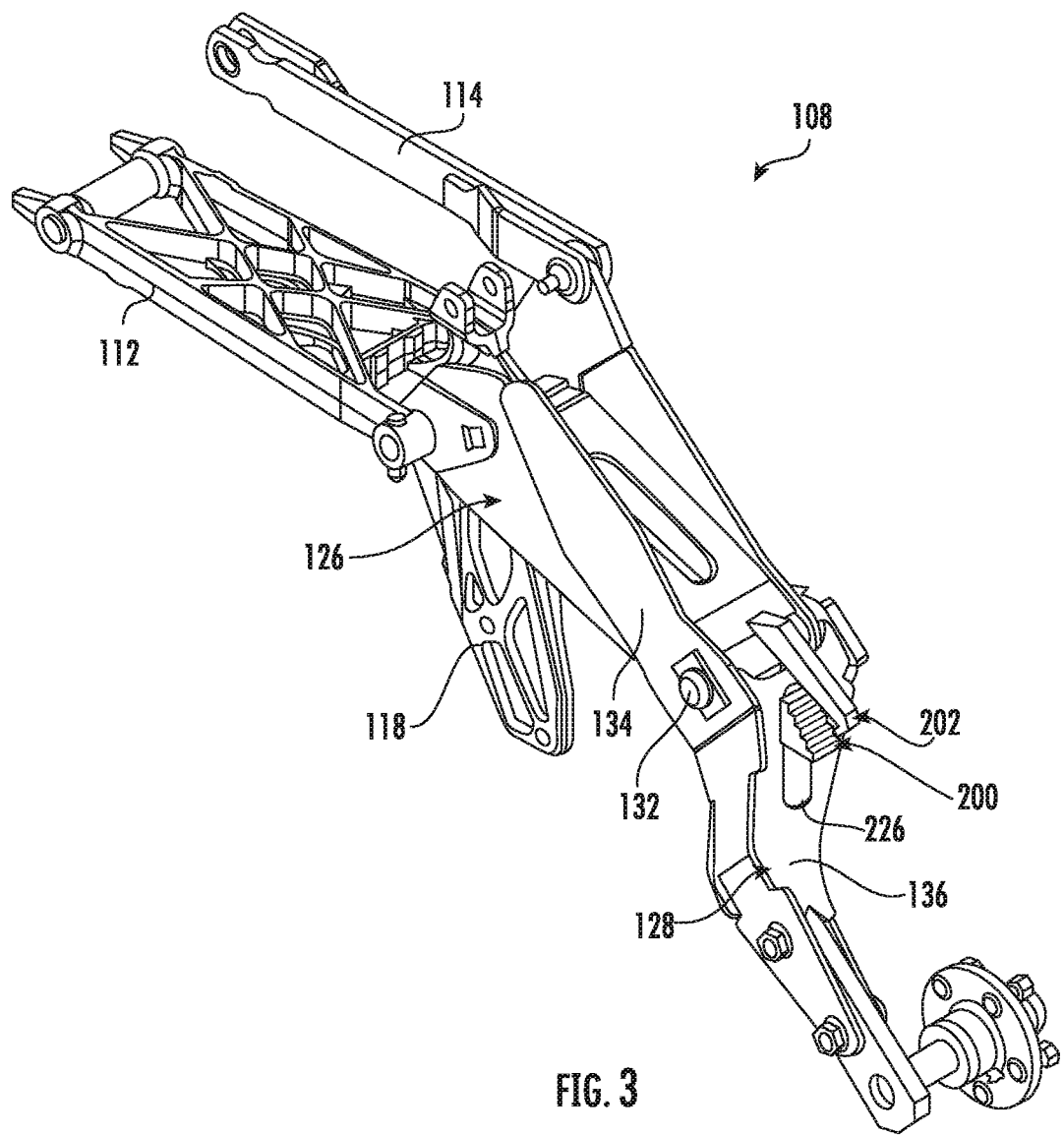
FIG. 3 illustrates a partial, perspective view of the seed planting unit shown in FIG. 2 with various components of the unit, including a packer wheel and a portion of the ground engaging tool, removed for purposes of illustration, particularly illustrating aspects of a support structure, a wheel support arm, the depth stop member and the depth adjustment member of the seed planting unit in accordance with aspects of the present subject matter.
Figure 4:
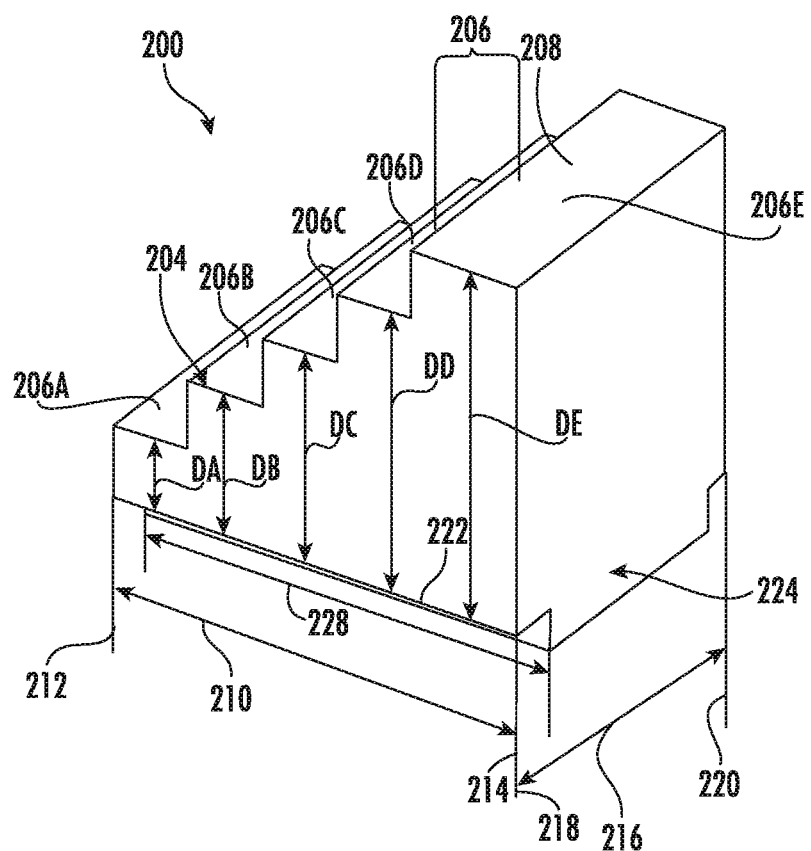
FIG. 4 illustrates a perspective view of the depth adjustment member of the seed planting unit shown in FIG. 3 in accordance with aspects of the present subject matter.
Figure 5:
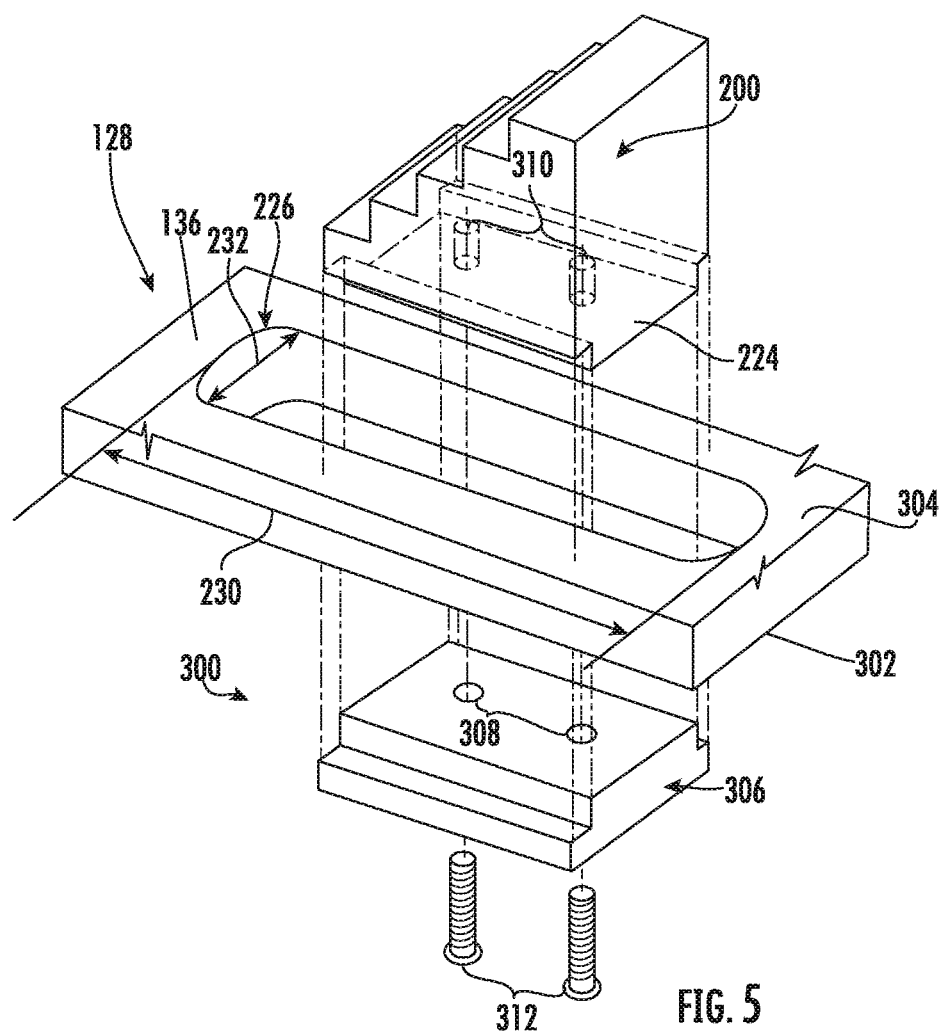
FIG. 5 illustrates a partial perspective view of the depth adjustment member positioned relative to the wheel support arm of the seed planting unit shown in FIG. 3 in accordance with aspects of the present subject matter, particularly illustrating an exploded view of the depth adjustment member, the wheel support arm and a locking plate.
Figure 6:
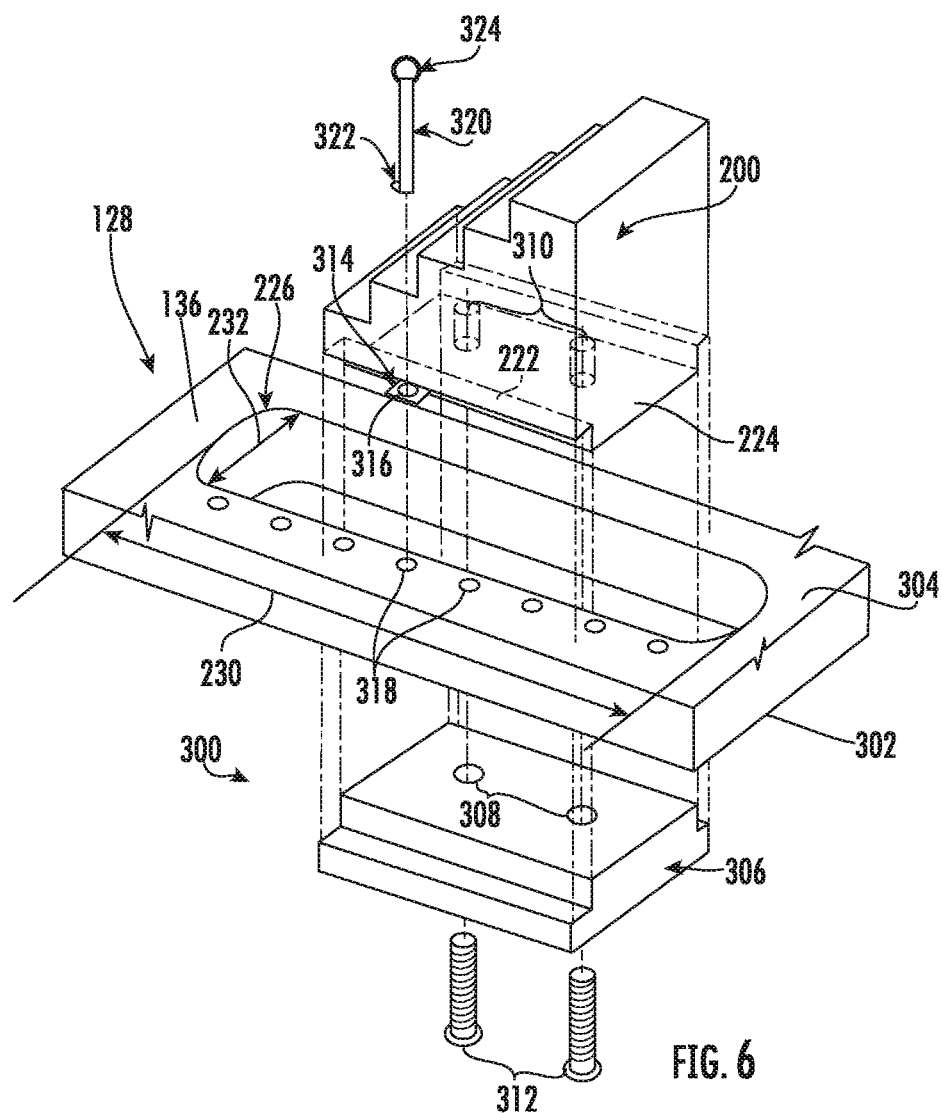
FIG. 6 illustrates another partial perspective view of the various components shown in FIG. 5, particularly illustrating an alternative embodiment for adjusting and/or fixing the position of the depth adjustment member relative wheel support arm.
Figure 7:
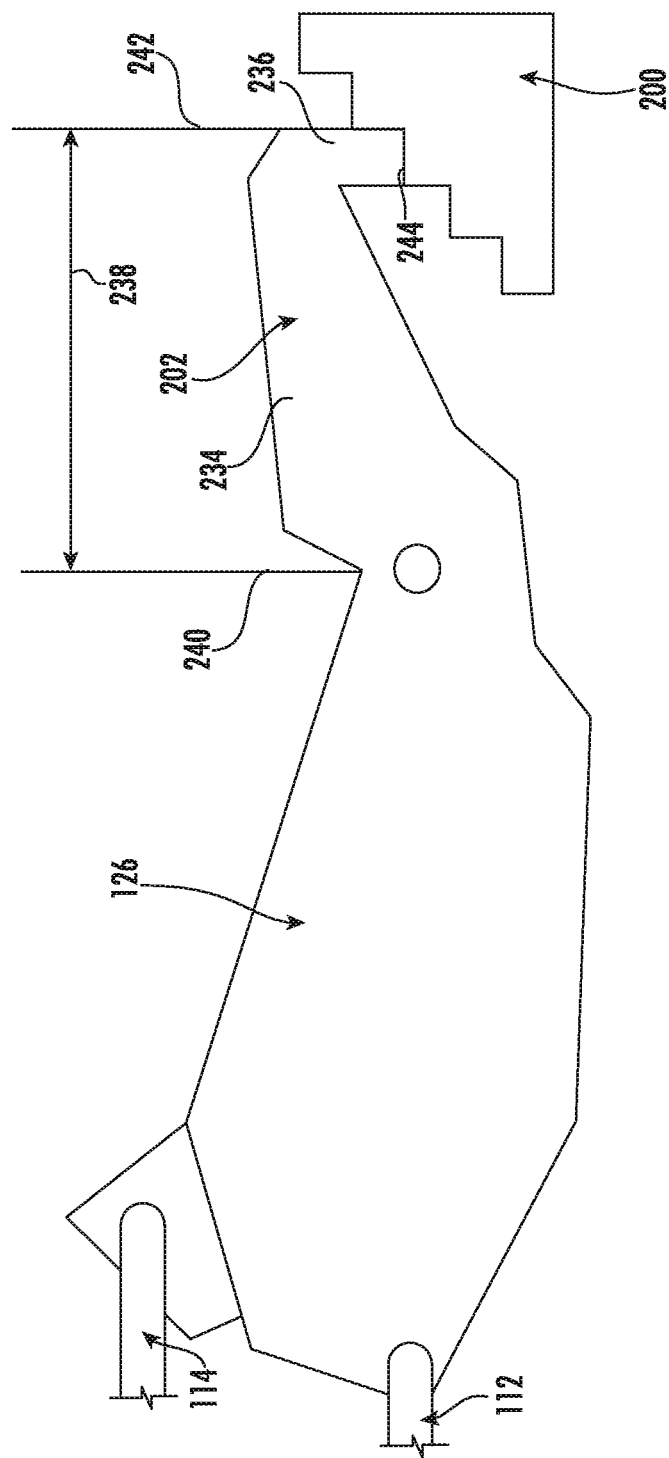
FIG. 7 illustrates a partial, side view of the seed planting unit shown in FIG. 3 in accordance with aspects of the present subject matter, particularly illustrating the depth stop member positioned relative to the depth adjustment member.
Figure 8:
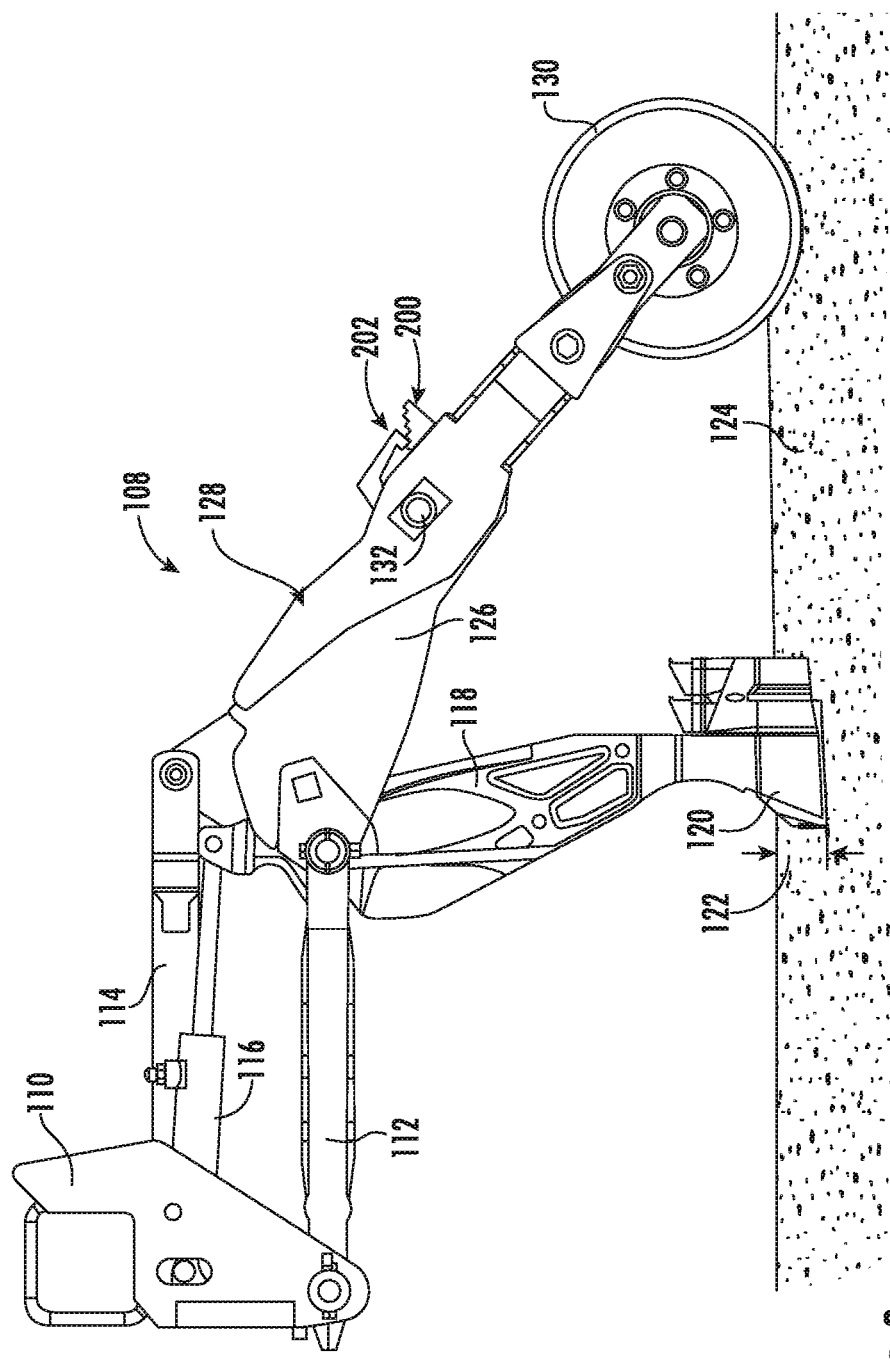
FIG. 8 illustrates a side view of the seed planting unit shown in FIG. 2 in accordance with aspects of the present subject matter, particularly illustrating the depth adjustment member positioned relative to the wheel support arm such that the ground engaging tool is disposed at its maximum penetration depth setting.
Figure 9:
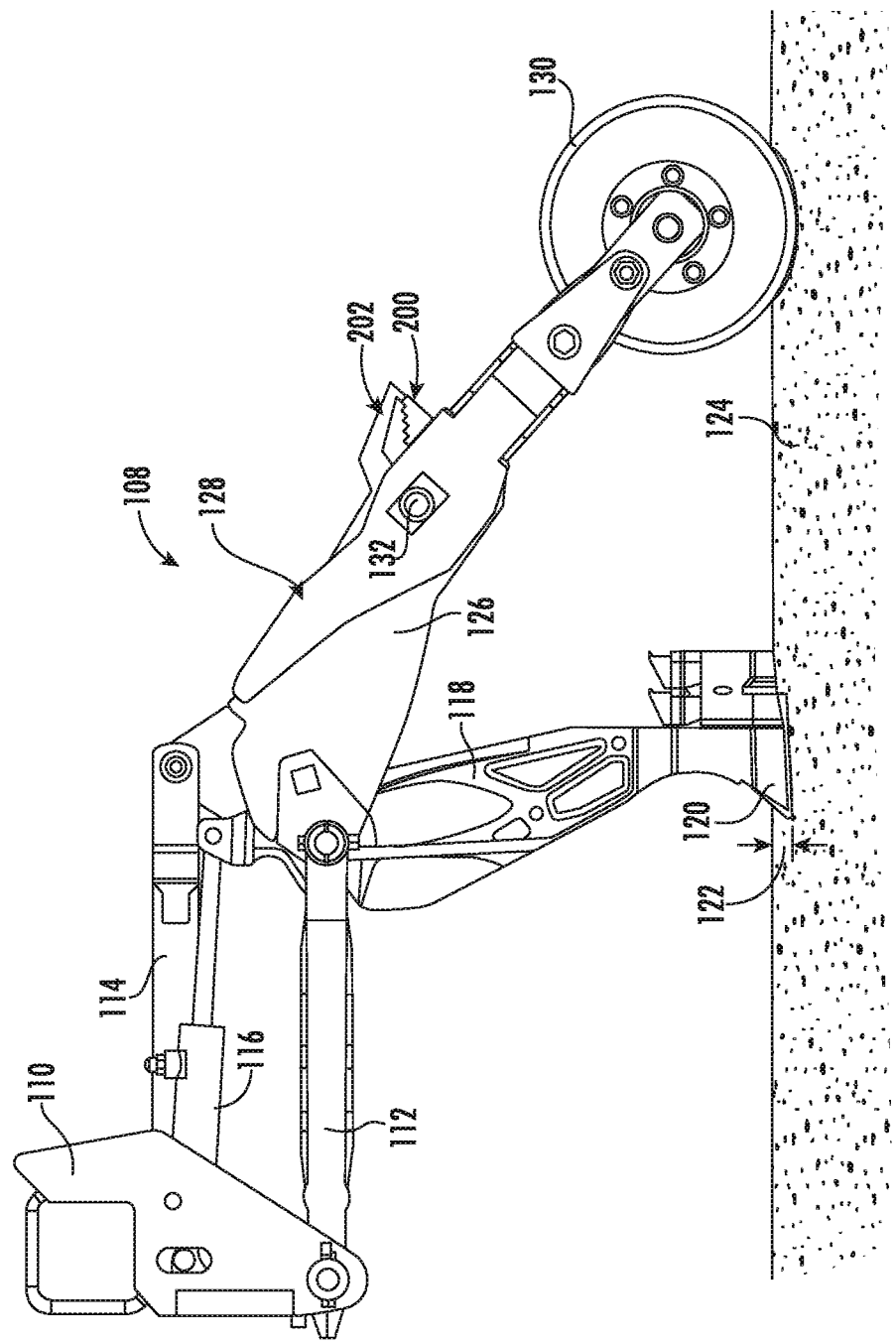
FIG. 9 illustrates a side view of the seed planting unit shown in FIG. 2, in accordance with aspects of the present subject matter particularly illustrating the depth adjustment member positioned relative to the wheel support arm such that the ground engaging tool is disposed at its minimum penetration depth setting.

Referring now to FIGS. 3-8, various views of one embodiment of a seed planting unit (e.g. the unit 108 shown in FIG. 2) are illustrated in accordance with aspects of the present subject matter. Specifically, FIG. 3 illustrates a partial, perspective view of the unit 108 described above with reference to FIG. 2, particularly depicting various components of the unit 108 (e.g., the opener 122 and the packer wheel 132) removed from the drawing for purposes of illustration. FIG. 4 illustrates a perspective view of the depth adjustment member 200 shown in FIGS. 2 and 3. FIGS. 5 and 6 illustrate partial perspective views of the seed planting unit 108 shown in FIG. 3, particularly illustrating the depth adjustment member 200 exploded away from a portion of the wheel support arm 128. FIG. 7 illustrates a side view of the support structure 126 of the seed planting unit 108 shown in FIG. 3, particularly illustrating the depth stop member 202 formed integrally with the support structure 126 and abutting against the depth adjustment member 200. Additionally, FIGS. 8 and 9 illustrate differing views of the seed planting unit 108 shown in FIG. 3, particularly illustrating the depth adjustment member 200 positioned at a maximum depth setting corresponding to a deepest penetration depth setting of the opener 120 (FIG. 8) and at a minimum depth setting corresponding to a shallowest penetration depth setting of the opener 120 (FIG. 9).

As indicated above, the seed planting unit 108 may include both a depth adjustment member 200 and a depth stop member 202 to allow the penetration depth setting of the opening 120 to be adjusted, as desired or necessary. As shown in the illustrated embodiment, the depth adjustment member 200 is generally provided in operative association with the wheel support arm 128 of the seed planting unit 108 while the depth stop member 202 is generally provided in operative association with the support structure 126 of the seed planting unit 108. Specifically, as will be described below, the depth adjustment member 200 may be configured to be movably or slidably coupled to the wheel support arm 128 to allow the relative positioning of the depth adjustment member 200 to be adjusted, while the depth stop member 202 may be configured to be fixed relative to the support structure 126 (e.g., by being formed integrally with the support structure 126 or by being rigidly coupled to the support structure 126). However, as will be described below with reference to FIGS. 10 and 11, the configuration of the depth adjustment components may be reversed, with the depth adjustment member 200 being movably or slidably coupled to the support structure 126 and the depth stop member 202 being fixed relative to the wheel support arm 128.

As shown in the illustrated embodiment, the depth stop member 202 is generally configured to contact or abut against a portion of a stepped profile defined by the depth adjustment member 200. In general, the depth adjustment member 200 may be configured to be moved relative to the wheel support arm 128 to adjust the relative positioning between the depth adjustment member 200 and the depth stop member 202, thereby varying which portion of the stepped profile the depth stop member 202 is configured to engage and, thus, varying the amount that the wheel support arm 128 is configured to pivot relative to the support structure 126. Specifically, the adjustment of the relative positioning between the depth adjustment member 200 and the depth stop member 202 varies the amount that the wheel support arm 128 is allowed to pivot before coming into contact with the depth stop member 202, which, in turn, varies the vertical positioning of the opener 120 (FIG. 2) relative to the packer wheel 130 (FIG. 2) and, thus, adjusts the penetration depth setting 122 of the opener 120. Additionally, in one embodiment, the depth adjustment member 200 may be configured to be selectively locked or otherwise engaged relative to the wheel support arm 128 to prevent further movement of the depth adjustment member 200 relative to both the wheel support arm 128 and the depth stop member 202, thereby setting the desired penetration depth for the opener 120.

As particularly shown in FIG. 4, the stepped profile (e.g., stepped profile 204) of the depth adjustment member 200 generally corresponds to a plurality of steps 206 formed within or defined along an upper surface 208 of the depth adjustment member 200. In such an embodiment, the depth stop member 202 may be generally configured to selectively abut one of the plurality of steps 206 when the wheel 130 is contacting the surface of the soil 124 to set the penetration depth setting 122 for the opener 120. As shown in the illustrated embodiment, the depth adjustment member 200 generally extends along a length 210 defined between a first end 212 and a second end 214 and along a width 216 defined between a first side 218 and a second side 220. The stepped profile 204 generally extends along the length 210 of the depth adjustment member 200 such that the plurality of steps 206 are spaced apart along the length 210, with each step 206 being defined at a different location along the length 210. The stepped profile 204 is generally configured to be spaced apart from a bottom or base surface 222 of the depth adjustment member 200 such that the steps 206 are disposed at varying distances relative to the base surface 222. For example, a first end step 206A is positioned proximate the first end 212 of the depth adjustment member 200 and is spaced apart from the base surface 222 by a first distance DA, where the first distance DA generally corresponds to or is associated with a maximum depth setting (FIG. 8) of the seed planting unit 108. A second end step 206E is positioned proximate the second end 214 of the depth adjustment member 200 and is spaced apart from the base surface 222 by a second distance DE, where the second distance DE corresponds to or is associated with a minimum depth setting (FIG. 9) of the seed planting unit 108.

Additionally, as shown in FIG. 4, the stepped profile 204 of the depth adjustment member 202 may include a series of intermediate steps positioned between the first and second end steps 206A, 206E. In this regard, each of the intermediate steps may be spaced apart from the base surface 222 by a respective larger distance than a respective previous step as the stepped profile extends from the first end 212 to the second end 214 of the depth adjustment member 200. For example, a first intermediate step 206B positioned adjacent the first end step 206A is spaced apart from the base surface 222 by a first intermediate distance DB, which is larger than the first distance DA. Similarly, a second intermediate step 206C positioned adjacent the first intermediate step 206B is spaced apart from the base surface 222 by a second intermediate distance DC, which is larger than the first intermediate distance DB. Additionally, a third intermediate step 206D positioned between the second intermediate step 206C and the second end step 206E is spaced apart from the base surface 222 by a third intermediate distance DD, which is larger than the second intermediate distance DC and smaller than the second distance DE. Thus, the distance between respective, consecutive steps of the plurality of steps 206 and the base surface 222 increases from the first end 212 to the second end 214 of the stepped profile 204. In such an embodiment, the depth adjustment member 200 may be configured to be installed on the wheel support arm 128 such that the first end step 206A is positioned closest to the pivot point of the wheel support arm 128 (e.g., at pin 132 in FIG. 3) and the second end step 206E is positioned furthest from the pivot point.

It should be appreciated that, in some embodiments, the distance between respective, consecutive steps of the plurality of steps 206 and the base surface 222 may be configured to non-linearly increase from the first end 212 to the second end 214 of the depth adjustment member 200. With such a non-linear increase, the penetration depth setting 122 may be configured to provide more fine or gradual changes within certain ranges (e.g., shallower ranges) of the opener's penetration depth that may require more precise positioning of the seed within the soil 124 and coarser or larger changes within other ranges (e.g., deeper ranges) of the opener's penetration depth where less precise positioning of the seed within the soil 124 is required. Further, while the stepped profile 204 of the depth adjustment member 200 is shown as only including five steps, this should not be construed as limiting. Instead, the stepped profile 204 may be configured to define any number of steps 206 to provide a desired range of incremental steps for adjusting the penetration depth setting 122.

As indicated above, the depth adjustment member 200 may be configured to be coupled to or supported by the wheel support arm 128 of the seed planting unit 108 such that it may be selectively slideable or movable relative to the wheel support arm 128. Specifically, as shown in FIGS. 3 and 5, the depth adjustment member 200 may be configured to be slideably coupled to the lower portion 136 of the wheel support arm 128 such that the depth adjustment member 200 may slide along its base surface 222 across the adjacent surface of the wheel support arm 128. For example, in one embodiment, the depth adjustment member 200 may include a protrusion 224 configured to be slideably engaged within a depth adjustment slot 226 (hereinafter referred to as "slot 226") formed within the lower portion 136 of the wheel support arm 128. Specifically, as shown in FIG. 4, the protrusion 224 may be configured to extend outwardly from the base surface 222, opposite the stepped profile 204, to allow the protrusion 224 to be received within the slot 226 defined by the wheel support arm 128. Similarly, as shown in FIG. 5, the slot 226 is configured such that it may at least partially receive the protrusion 224 when the depth adjustment member 200 is positioned relative to the wheel support arm 128. For example, in one embodiment, the slot 226 may generally extend along a length 230, where the length 230 of the slot 226 is greater than a corresponding length 228 of the protrusion 224 to allow the depth adjustment member 200 to be slid or moved relative to the wheel support arm 128 across a range of positions to set the desired penetration depth for the opener 120. Additionally, the slot may also generally extend along a width 232, wherein the width 232 of the slot 226 is less than the width 216 of the depth adjustment member 200 to allow the base surface 222 of the depth adjustment member 200 to be supported by the wheel support arm 128 as the protrusion 224 is slid or moved within the slot 226.

By movably or slidably coupling the depth adjustment member 200 to the wheel support arm 128, the depth adjustment member 200 may be moved relative to the wheel support arm 128 in a direction away from the depth stop member 202 to a suitable position that allows the depth stop member 202 to abut against the first end step 206A of the depth adjustment member 200 when the seed planting unit 108 is located at its working position. As shown in FIG. 8, at such position, the opener 120 may be disposed at its maximum penetration depth setting 122. Similarly, the depth adjustment member 200 may be moved relative to the wheel support arm 128 in a direction towards the depth stop member 202 to a suitable position that allows the depth stop member 202 to abut against the second end step 206E of the depth adjustment member 200 when the seed planting unit 108 is located at its working position. As shown in FIG. 9, at such position, the opener may be disposed at its minimum penetration depth setting 122.

As indicated above, in several embodiments, the depth stop member 202 may be fixed relative to the support structure 126, such as by being formed integrally with the support structure 126 and/or by being rigidly coupled to the support structure 126. As shown in FIG. 7, in one embodiment, the depth stop member 202 may generally include an extending portion 234 and an abutment portion 236. The extending portion 234 extends generally outwardly from the support structure 126 along a length 238 defined between a proximal end 240 and a distal end 242. The length 238 of the extending portion 234 is configured to be approximately equal to or greater than the length 210 of the depth adjustment member 200 such that all of the steps 206 may be positioned below the extending portion 234 to prevent interference between the abutment portion 236 and the steps 206 at locations further from the pivot point of the wheel support arm 128. Additionally, the abutment portion 236 may generally extend downwardly from the distal end 242 of the extending portion 234 to form an abutment surface 244 configured to contact or otherwise abut against the steps 206 during the working mode. The abutment surface 244 may be configured, as shown in FIG. 7, to be planar such that, when the depth stop member 202 abuts the depth adjustment member 200, the abutment surface 244 is substantially parallel to the steps 206. However, it should be appreciated that the abutment surface 244 may have any other suitable configuration that allows it to abut against the steps 206.

Moreover, as indicated above, the support structure 126 may be movable between a working position and an adjustment position. More specifically, when the seed planting unit 108 is lifted (e.g., by cylinder 116) such that the wheel 130 and opener 120 are no longer in engagement or contact with the soil 124, the support structure 126 (and associated depth stop member 200) may rotate into the adjustment position and the wheel support arm 128 may pivot downward into a more vertical orientation relative to the soil 124 such that the depth adjustment member 200 is spaced apart from the depth stop member 202. While the support structure 126 is in the adjustment position, the depth adjustment member 200 may be configured to be slidable or movable relative to the wheel support arm 128. When the desired position of the depth adjustment member 200 relative to the wheel support arm 128 is reached, the seed planting unit 108 may be lowered such that the support structure 126 rotates into the working position and the wheel 130 again engages the soil 124, causing the lower portion 136 of the wheel support arm 128 to pivot upward until the abutment surface 244 of the depth stop member 202 abuts against the adjacent step 206 of the depth adjustment member 200, thus limiting further rotation of the wheel support arm 128 relative to the support structure 126.

Additionally, in several embodiments, the depth adjustment member 200 may be configured to be locked or otherwise fixed relative to the wheel support arm 128. For example, in one embodiment, the depth adjustment member 200 may be configured to be secured to the wheel support arm 128 via a locking plate 300. Specifically, as shown in FIG. 5, the locking plate 300 may configured to be positioned on the side (i.e., a lower side 302) of the wheel support arm 128 opposite the side (i.e., an upper side 304) on which the depth adjustment member 200 is positioned. For example, the locking plate 300 may be positioned on the lower side 302 of the wheel support arm 128 such that a protruding member 306 of the locking plate 300 is received within the slot 226 defined through the wheel support arm 128. Additionally, as shown in FIG. 5, aligned fastener openings 308, 310 may be defined in both the locking plate (e.g., openings 308 defined through the protruding member 306) and the depth adjustment member 200 (e.g., openings 310 defined through the protrusion 224) for receiving fasteners 312 for coupling the locking plate to the depth adjustment member 200. In such an embodiment, the openings 310 defined in the depth adjustment member 200 may, for example, be threaded to allow the depth adjustment member 200 and the locking plate 300 to be selectively tightened relative to the wheel support arm 128. Specifically, by tightening the fasteners 312, the depth adjustment member 200 and the locking plate 300 may be clamped against the wheel support arm 128 thereby preventing movement of the depth adjustment member 200 relative to the arm 128.

Similarly, by loosening the fasteners 312 a sufficient amount, the depth adjustment member 200 may be moved relative to the wheel support arm 128 to allow the penetration depth setting 122 for the opener 120 to be adjusted. In another embodiment, the depth adjustment member 200 may be configured to be secured to the wheel support arm 128 in any other suitable manner, such as by simply using the fasteners 312 without the locking plate 300. For example, washers or other suitable elements may be installed on the fasteners 312 such that, when the fasteners 312 are inserted through the slot 226 from the bottom side 302 of the wheel support arm 128 and into the fastener openings 308, 310, the fasteners 312 may be tightened to clamp the depth adjustment member 200 against the wheel support arm 128.

By configuring the seed planting unit 108 to include the locking plate 300 as described above with reference to FIG. 5, the protrusion 224 of the depth adjustment member 200 may be retained or trapped within the slot 226 of the wheel support arm 128 along at least a part of the protruding member 306 of the locking plate 300 such that the clamping force applied on the depth adjustment member 200 and the locking plate 300 is distributed evenly across the base surface 222 of the depth adjustment member 200 and the locking plate 300 to improve the contact between the depth adjustment member 200, the locking plate 300 and the wheel support arm 128. In such an embodiment, the wear on the openings 310 of the depth adjustment member 200 and the fasteners 312 may also be reduced, allowing for a longer and more reliable usable life. Further, the locking plate 300 may serve as an additional damping member against vibrations during operation of the seed planting unit 108, thus preventing accidental disengagement during operation and therefore improving the reliability of locking of the depth adjustment member 200 relative to the wheel support arm 128.

Additionally, in another embodiment, the depth adjustment member 200 may be configured to be secured to the wheel support arm 128 in discrete positions. For example, as shown in FIG. 6, the depth adjustment member may be configured to be fastened to the wheel support arm 128 via at least one fastener (e.g., set pin 320). Specifically, as shown in FIG. 6, corresponding fastener openings 316, 318 may be defined in both a flange 314 extending outwardly from the depth adjustment member 200 adjacent the base surface 222 (e.g., opening 316 defined through the flange 314) and the wheel support arm 128 (e.g., openings 318 defined at least through the upper side 304) for receiving the set pin 320 for coupling the depth adjustment member 200 to the wheel support arm 128. The openings 318 defined in the wheel support arm 128 may be spaced apart along the length 230 of the slot 226 by discrete increments.

In such an embodiment, each opening 318 in the wheel support arm 128 may generally correspond to a position of a respective one of the steps 206 when the set pin 320 is received within the respective opening 318. For example, an operator may remove the pin 320 from the opening 318 in the wheel support arm 128, slide the depth adjustment member 200 along the slot 226 to the desired position, and then reinsert the fastener 320 into one of the corresponding openings 318 to fix the position of the depth adjustment member 200 relative to the wheel support arm 128. This allows the depth adjustment member 200 to be correspondingly moved into discrete positions relative to the wheel support arm 128. As such, an operator may more easily and securely adjust the penetration depth setting 122 of the opener 120 to a desired penetration depth.

In embodiments in which the fastener 320 is configured as a set pin, the fastener 320 may, for example, include a detent ball 322 at one end, such that the fastener 320 may be slidably removable from the openings 316, 318 while preventing accidental or unintentional of the fastener 320 therefrom. Additionally, in one embodiment, the fastener 320 may include a pull ring 324, by which the operator may more easily remove the fastener 320 from the opening 318.

Moreover, in embodiments including both the locking plate 300 and the fastener 320 described above, the fasteners 312 associated with the locking plate 300 need not be fastened or tightened in a manner that clamps the depth adjustment member 200 against the wheel support arm 128. Instead, the depth adjustment member 200 can be held in place relative to the wheel support arm 128 by the fastener 320, while the locking plate 300 can be used to guide the sliding movement of the depth adjustment member 200 relative to the wheel support arm 128. As such, the operator may adjust the penetration depth setting 122 of the opener 120 more quickly and with fewer tools.

Figure 10:
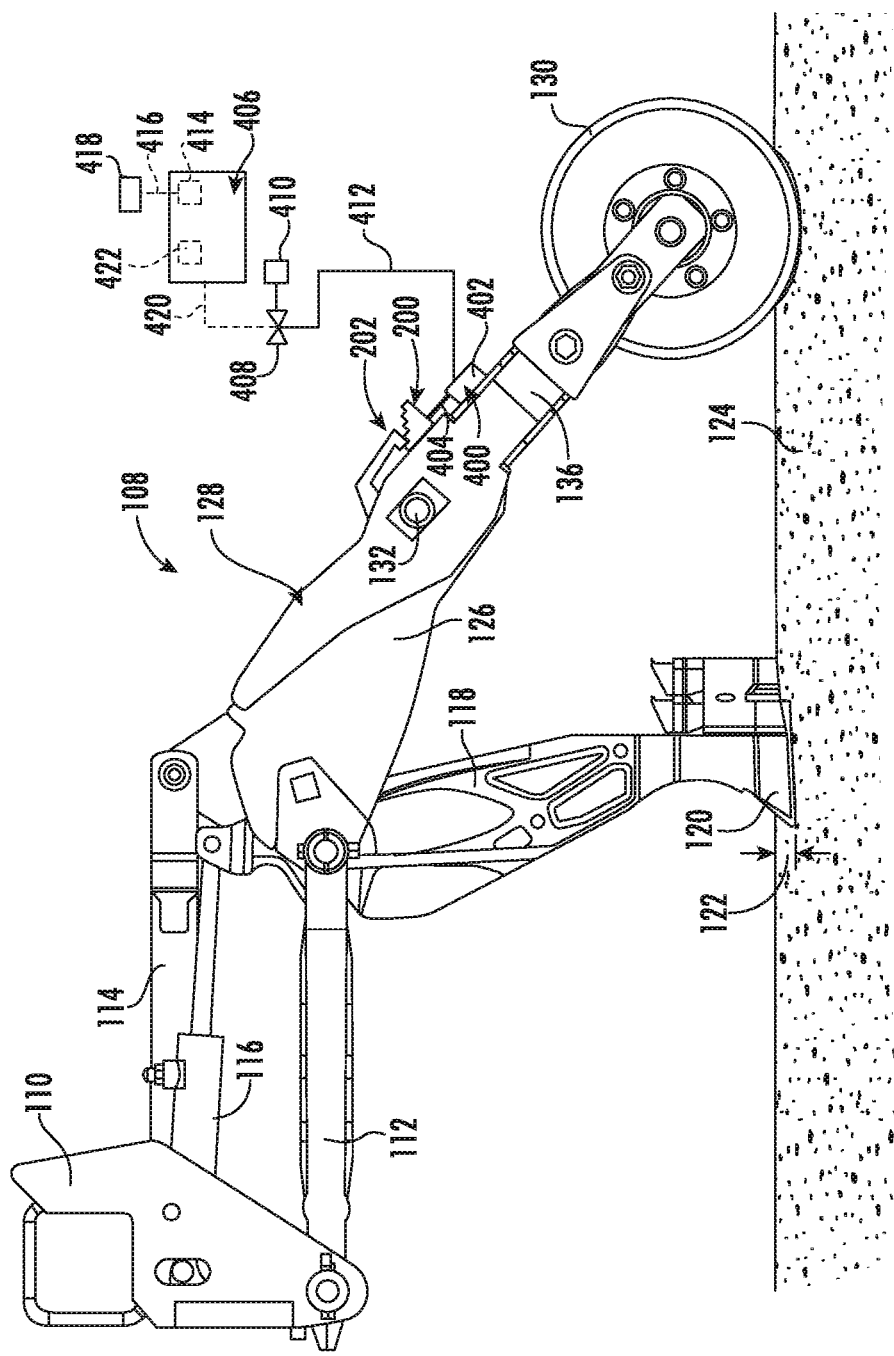
FIG. 10 illustrates a side view of another embodiment of the seed planting unit shown in FIG. 2 in accordance with aspects of the present subject matter, particularly illustrating the seed planting unit including an actuator configured to adjust the position of the depth adjustment member relative to the depth stop member.

Referring now to FIG. 10, a side view of a further embodiment of the seed planting unit 108 described above is illustrated in accordance with aspects of the present subject matter. Specifically, FIG. 10 illustrates an alternative embodiment of the seed planting unit 108 having the depth adjustment member 200 and an actuator 400 configured for adjustment of the position of the depth adjustment member 200 relative to the wheel support arm 128 and the depth stop member 202, thereby allowing the penetration depth setting 122 of the opener 120 to be automatically adjusted. As discussed in detail below, the depth adjustment member 200 is configured to be slidable or otherwise moveable by the actuator 400 relative to the wheel support arm 128 when it is desired to adjust the penetration depth setting 122 of the opener 120. Further, the depth adjustment member 200 may be configured to be selectively locked relative to the wheel support arm 128 by the actuator 400 to prevent further relative sliding movement of the depth adjustment member 200, thereby setting the desired penetration depth for the opener 120.

In the illustrated embodiment, the actuator 400 includes a base cylinder 402 and an actuating arm 404, with the base cylinder 402 being rotatably mounted to the wheel support arm 128 of the seed planting unit 108 and the actuating arm 404 being rotatably coupled to the depth adjustment member 200. As such, movement of the actuating arm 404 relative to the base cylinder 402 causes the depth adjustment member 200 to slide relative to the wheel support arm 128 such that the depth stop member 202 may abut against a different step 206 of the depth adjustment member 200 when the support structure 126 is in the working position to adjust the penetration depth setting of the opener 120.

In several embodiments, the operation of the actuator 400 may be electronically controlled via a controller 406, such as any suitable processor-based device(s) having a processor and a memory configured to store computer-readable instructions that can be executed by the processor. In such an embodiment, the controller 406 may be configured to control the operation of one or more components that regulate the actuation of the actuating arm 404 relative to the cylinder 402. For example, the controller 406 may be communicatively coupled to one or more control valve(s) 408 configured to regulate the supply of fluid 410 (e.g., hydraulic fluid or air) to the actuator 400. In such instance, the control valve(s) 408 may be fluidly connected to the actuator 400 through a hydraulic line(s) 412.

Moreover, the controller 406 may also include a communications interface 414 to provide a means for the controller 406 to communicate with any of the various other system components of the agricultural implement and/or any components of the work vehicle towing the implement. For instance, one or more communication links or interfaces 416 may be provided between the communications interface 414 and a user interface 418 to allow the controller to receive input signals from the user interface 418. The user interface 418 may be configured to receive information from the operator such as, but not limited to, information regarding the desired penetration depth setting for the opener 120, and to send input signals to the communications interface 414 via the communication link(s) 416. Similarly, one or more communicative links or interfaces 420 may be provided between the communications interface 416 and the actuator(s) 400 (and/or a related component configured to control the operation of the actuator(s) 400, such as a related control valve(s) 408) to allow the operation of the actuator(s) 400 to be controlled by the controller 406.

In one embodiment, the controller 406 may also include means to verify the position of the depth adjustment member 200. For example, a position sensor 422 may be in communication with the controller 406, with the position sensor 422 being configured to detect a position of the depth adjustment member 200. The controller 406 may be programmed to compare the sensed position 422 of the depth adjustment member 200 detected by the position sensor to a predetermined position determined from a user input and control the actuating arm 404 accordingly. In such a way, the penetration depth setting 122 of the opener 120 can be actively monitored and adjusted, and/or an operator notification can be generated based on the position of the depth adjustment member 200 to allow for more accurate control the depth setting for the opener 120.

By configuring the seed planting unit 108 to have an electronically controlled actuator, such as the actuator 400 described above with reference to FIG. 10, the penetration depth of the seed planting unit 108 may be adjusted automatically (i.e., without manual manipulation of the depth adjustment member 200) when the support structure 126 is in the adjustment position. As such, the time required to adjust the penetration depth may be reduced significantly, thus increasing seeding efficiency. For example, in instances in which each seed planting unit 108 includes an associated actuator 400, the operator may provide an input (via the user interface 418) instructing the controller 406 to control the operation of the various actuators 400 such that the penetration depth setting for each opener 120 of the implement is adjusted to a given operator-selected setting. Additionally, the depth adjustment member 200 may be locked into position relative to the wheel support arm 128 by use of the actuator 400 alone, thus reducing material costs and the complexity of the seed planting unit 108.

Figure 11:
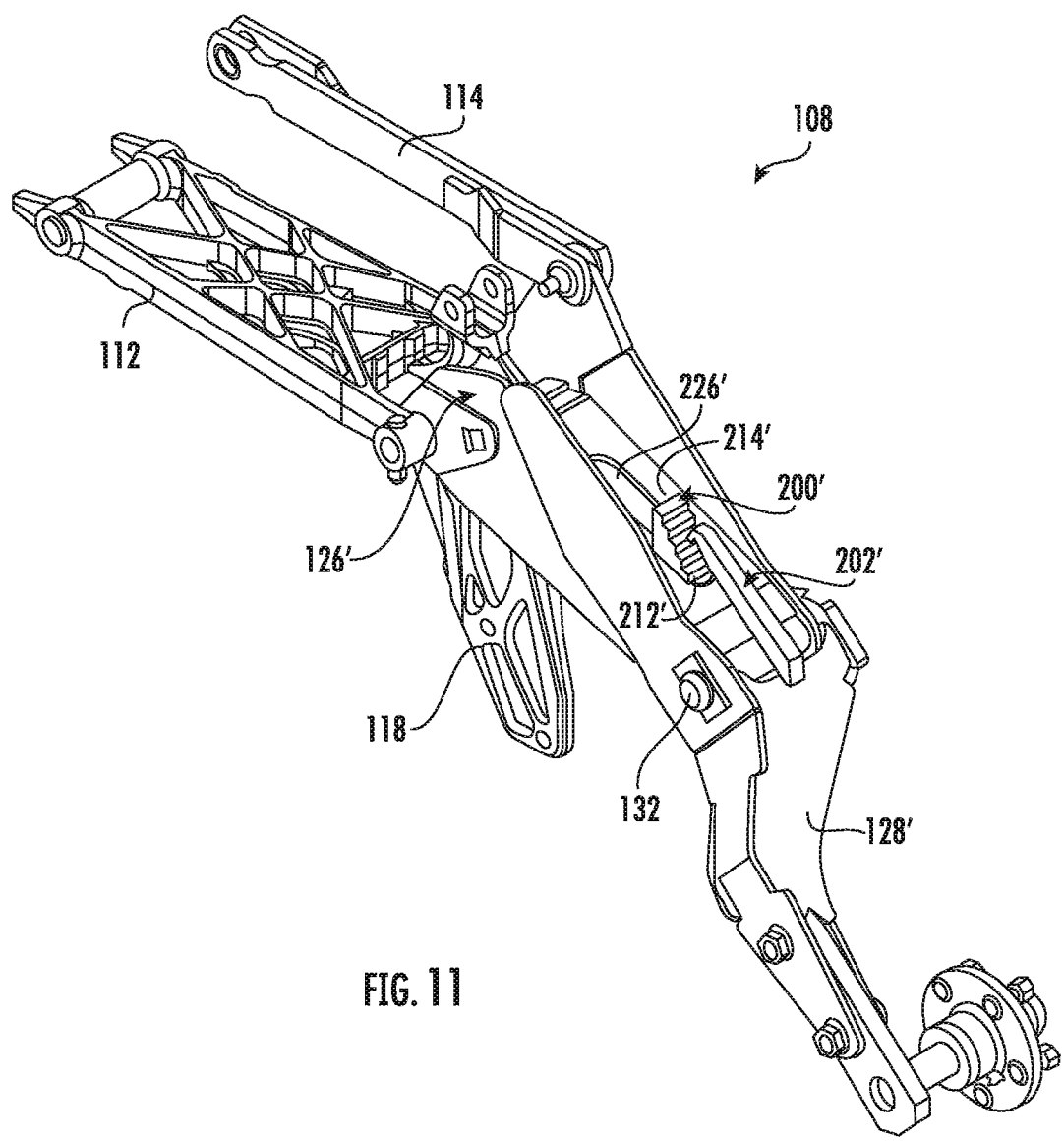
FIG. 11 illustrates a partial, perspective view of another embodiment of a seed planting unit suitable for use within the agricultural implement shown in FIG. 1, particularly illustrating aspects of a support structure, a wheel support arm, a depth stop member, and a depth adjustment member of the seed planting unit in accordance with aspects of the present subject matter.

Referring now to FIG. 11, a partial, perspective view of another embodiment of a seed planting unit 108 suitable for use within the agricultural implement shown in FIG. 1 is illustrated in accordance with aspects of the present subject matter. Specifically, FIG. 11 illustrates an alternate embodiment of the seed planting unit 108 having a support structure 126', a wheel support arm 128', a depth adjustment member 200', and a depth stop member 202'. As discussed in detail below, the depth adjustment member 200' is configured to be supported by and otherwise movable relative to the support structure 126' when it is desired to adjust the penetration depth setting 122 of the opener 120. Further, the depth stop member 202' may be provided in operative association with the wheel support arm 128' to selectively abut against the depth adjustment member 200', thereby setting the desired penetration depth for the opener 120.

In the illustrated embodiment, both the support structure 126' and the wheel support arm 128' are generally configured the same as or similar to the support structure 126 and the wheel support arm 128, respectively, described above with reference to the embodiments shown in FIGS. 3-9. However, unlike the support structure 126 described above that includes the depth stop member 202 extending therefrom, the support structure 126' instead includes a depth adjustment slot 226' (e.g., configured the same as or similar to the depth adjustment slot 226 of the wheel support arm 128 described above) configured to allow the depth adjustment member 200' to be slidably or movably coupled to the support structure 126'. In such an embodiment, the depth stop member 202' may, instead, be provided in operative association with the wheel support arm 128'. For example, as shown in FIG. 10, the depth stop member 202' may be formed integrally with or rigidly coupled to a portion of the wheel support arm 128' such that the depth stop member 202' extends outwardly therefrom in the direction of the location at which the depth adjustment member 200' is installed on the support structure 126'. As such, the depth adjustment member 200' may be moved relative to the support structure 126' in a direction away from the depth stop member 202' to a suitable position that allows the depth stop member 202' to abut against the shortest step of the depth adjustment member 200' (e.g., first end step 206A shown in FIG. 4) when the seed planting unit 108 is located at its working position, thereby allowing the opener 120 to be disposed at its maximum penetration depth setting 122. Similarly, the depth adjustment member 200 may be moved relative to the support structure 126' in a direction towards the depth stop member 202' to a suitable position that allows the depth stop member 202' to abut against the tallest step of the depth adjustment member 200' (e.g., the second end step 206E shown in FIG. 4) when the seed planting unit 108 is located at its working position, thereby allowing the opener 120 to be disposed at its minimum penetration depth setting 122.

Figure 12:
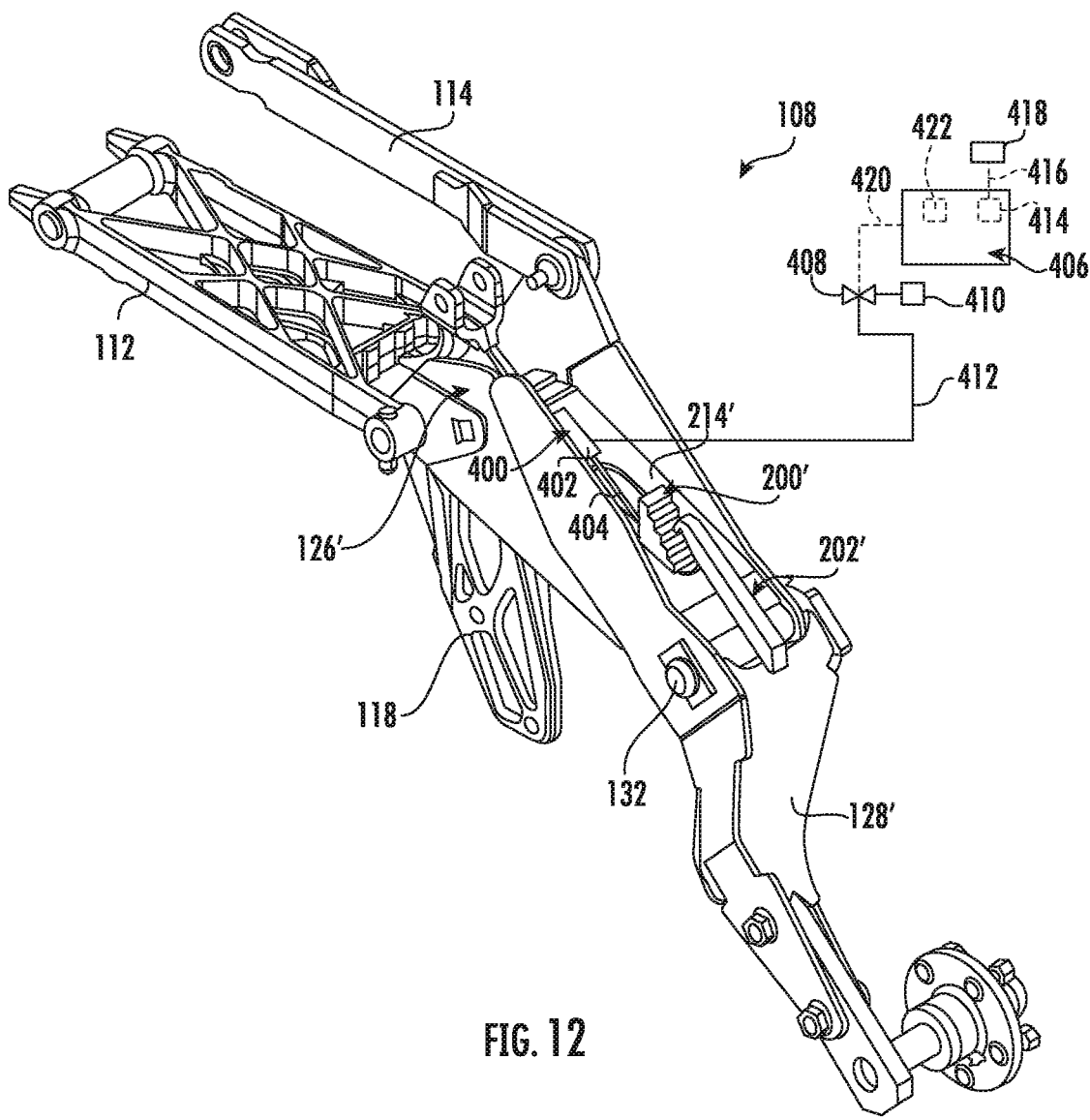
FIG. 12 illustrates a partial, perspective view of a further embodiment of the seed planting unit shown in FIG. 11 in accordance with aspects of the present subject matter, particularly illustrating the seed planting unit including an actuator configured to adjust the position of the depth adjustment member relative to the depth stop member.

Referring now to FIG. 12, another embodiment of the seed planting unit described above with reference to FIG. 11 is illustrated in accordance with aspects of the present subject matter. The embodiment of FIG. 12 is similar to the embodiment shown in FIG. 10, except that the cylinder of the actuator 400 is coupled to the support structure 126', while the actuating arm of the actuator is coupled to the depth adjustment member 200'. However, it should be appreciated that, in general, the actuator 400 may be coupled between the depth adjustment member 200' and any other suitable component that allows the actuator 400 to function as described herein (e.g., to allow the actuator 400 to actuate the depth adjustment member 200' relative to the support structure 126'). The penetration depth of the seed planting unit 108 may therefore be adjusted automatically (i.e., without manual manipulation of the depth adjustment member 200') when the support structure 126' is in the adjustment position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A seed planting unit of an agricultural implement, the seed planting unit comprising:
    a ground engaging tool configured to penetrate a soil surface;
    a support structure configured to support the ground engaging tool;
    a wheel support arm pivotally coupled to the support structure at a pivot point, the wheel support arm including an upper portion and a lower portion;
    a wheel rotatably supported by the lower portion of the wheel support arm, the wheel configured to contact the soil surface to define a penetration depth setting for the ground engaging tool relative to the soil surface;
    a depth stop member provided in operative association with one of the support structure or the wheel support arm;
    a depth adjustment member provided in operative association with the other of the support structure or the wheel support arm, the depth adjustment member having a base surface and defining a stepped profile spaced apart from the base surface, the stepped profile defining a plurality of steps disposed at varying distances relative to the base surface, the depth adjustment member being configured to be selectively movable relative to the other of the support structure or the wheel support arm to vary a relative position between the depth adjustment member and the depth stop member,
    wherein the depth stop member is configured to selectively abut one of the plurality of steps when the wheel is contacting the soil surface to set the penetration depth setting for the ground engaging tool;
wherein the depth adjustment member includes a first end and a second end and defines a length between the first and second ends, the stepped profile extending along at least a portion of the length of the depth adjustment member such that each of the plurality of steps is defined at a different location between the first and second ends of the depth adjustment member;
wherein a first step of the plurality of steps is positioned proximate the first end of the depth adjustment member and spaced apart from the base surface by a first distance associated with a maximum depth setting for the ground engaging tool; and
    a second step of the plurality of steps is positioned proximate the second end of the depth adjustment member and spaced apart from the base surface by a second distance associated with a minimum depth setting for the ground engaging tool;
    wherein the first end of the depth adjustment member is closer to the pivot point of the wheel support arm than the second end of the depth adjustment member.

2. The seed planting unit of claim 1, wherein the plurality of steps comprises a plurality of intermediate steps positioned between the first and second steps along the length of the depth adjustment member, each successive intermediate step of the plurality of intermediate steps from the first end to the second end being spaced apart from the base surface by a respective larger distance than a respective previous step of the plurality of steps.

3. The seed planting unit of claim 1, wherein the support structure is configured to be selectively moved between a working position, where the ground engaging tool is configured to penetrate the soil surface and the depth stop member is configured to abut the one of the plurality of steps, and an adjustment position, where the ground engaging tool is configured to be positioned above the soil surface and the depth stop member is configured to be spaced apart from the depth adjustment member such that the depth adjustment member is movable relative to the other of the support structure or the wheel support arm to adjust the relative position between the depth stop member and the depth adjustment member.

4. The seed planting unit of claim 1, further comprising an actuator configured to selectively actuate the depth adjustment member such that the depth adjustment member moves relative to the other of the support structure or the wheel support arm to vary the relative position between the depth adjustment member and the depth stop member.

5. The seed planting unit of claim 4, wherein the actuator corresponds to a fluid-driven actuator coupled at one end to the depth adjustment member and at an opposed end to the other of the support structure or the wheel support arm.

6. The seed planting unit of claim 1, further comprising:
a locking plate configured to be positioned on an opposite side of the other of the support structure or the wheel support arm, the locking plate configured to be selectively coupled to the depth adjustment member so as to maintain a position of the depth adjustment member relative to the other of the support structure or the wheel support arm.

7. The seed planting unit of claim 6, further comprising at least one fastener configured to tighten the locking plate relative to the other of the support structure or the wheel support arm, thereby locking the position of the depth adjustment member relative to the other of the support structure or the wheel support arm.

8. The seed planting unit of claim 1, wherein a plurality of openings are defined within the other of the support structure or the wheel support arm, each of the plurality of openings being configured to receive a fastener extending through a flange extending outwardly from the depth adjustment member adjacent the base surface to lock the position of the depth adjustment member relative to the other of the support structure or the wheel support arm.

9. The seed planting unit of claim 1, wherein the depth adjustment member is selectively movable relative to the wheel support arm and the depth stop member is provided in operative association with the support structure.

10. An agricultural implement, comprising:
a frame;
a plurality of seed planting units supported by the frame, the plurality of seed planting units being configured to deposit seeds within a field as the implement is moved across the field, each seed planting unit comprising:
a ground engaging tool configured to penetrate a soil surface of the field;
a support structure configured to support the ground engaging tool;
a wheel support arm pivotally coupled to the support structure at a pivot point, the wheel support arm including an upper portion and a lower portion;
a wheel rotatably supported by the lower portion of the wheel support arm, the wheel configured to contact the soil surface to define a penetration depth setting for the ground engaging tool relative to the soil surface;
a depth stop member provided in operative association with one of the support structure or the wheel support arm;
a depth adjustment member provided in operative association with the other of the support structure or the wheel support arm, the depth adjustment member having a base surface and defining a stepped profile spaced apart from the base surface, the stepped profile defining a plurality of steps disposed at varying distances relative to the base surface, the depth adjustment member being configured to be selectively movable relative to the other of the support structure or the wheel support arm to vary a relative position between the depth adjustment member and the depth stop member,
wherein the depth stop member is configured to selectively abut one of the plurality of steps when the wheel is contacting the soil surface to set the penetration depth setting for the ground engaging tool;
wherein the depth adjustment member includes a first end and a second end and defines a length between the first and second ends, the stepped profile extending along at least a portion of the length of the depth adjustment member such that each of the plurality of steps is defined at a different location between the first and second ends of the depth adjustment member;
wherein a first step of the plurality of steps is positioned proximate the first end of the depth adjustment member and spaced apart from the base surface by a first distance associated with a maximum depth setting for the ground engaging tool; and
a second step of the plurality of steps is positioned proximate the second end of the depth adjustment member and spaced apart from the base surface by a second distance associated with a minimum depth setting for the ground engaging tool;
wherein the first end of the depth adjustment members is closer to the pivot point of the wheel support arm than the second end of the depth adjustment member.

11. The agricultural implement of claim 10, wherein the plurality of steps comprises a plurality of intermediate steps positioned between the first and second steps along the length of the depth adjustment member, each successive intermediate step of the plurality of intermediate steps from the first end to the second end being spaced apart from the base surface by a respective larger distance than a respective previous step of the plurality of steps.

12. The agricultural implement of claim 10, further comprising an actuator configured to selectively actuate the depth adjustment member such that the depth adjustment member moves relative to the other of the support structure or the wheel support arm to vary the relative position between the depth adjustment member and the depth stop member.

13. The agricultural implement of claim 10, wherein the depth adjustment member is selectively movable relative to the wheel support arm and the depth stop member is provided in operative association with the support structure.

14. The agricultural implement of claim 10, wherein the depth adjustment member is selectively movable relative to the support structure and the depth stop member is provided in operative association with the wheel support arm.

* * * * *